United States Patent [19]
Iwamoto

[11] 3,938,027
[45] Feb. 10, 1976

[54] ELECTRICAL THYRISTOR CIRCUIT
[75] Inventor: Hideo Iwamoto, Itami, Japan
[73] Assignee: Mitsubishi Denki Kabushiki Kaisha, Tokyo, Japan
[22] Filed: June 12, 1974
[21] Appl. No.: 478,512

[52] U.S. Cl. ............................ 321/45 C; 307/252 M
[51] Int. Cl.² ........................................... H02M 7/515
[58] Field of Search ............ 321/43, 44, 45 R, 45 C; 318/341; 307/252 J, 252 M

[56] References Cited
UNITED STATES PATENTS

| | | | |
|---|---|---|---|
| 3,328,668 | 6/1967 | Nolan et al. | 321/45 R |
| 3,374,414 | 3/1968 | Garnett | 321/45 R |
| 3,404,293 | 10/1968 | Harris et al. | 307/252 J |
| 3,594,629 | 7/1971 | Kawakami et al. | 321/45 C |
| 3,667,021 | 5/1972 | Anderson et al. | 321/45 C |
| 3,846,644 | 11/1974 | Takagi et al. | 307/252 J |

*Primary Examiner*—William M. Shoop
*Attorney, Agent, or Firm*—Oblon, Fisher, Spivak, McClelland & Maier

[57] ABSTRACT

An electrical circuit comprising at least one thyristor having an anode, cathode and gate; an ignition circuit for applying an ignition signal between the gate and cathode of the thyristor when turning on the thyristor; a turn-off circuit for turning off the thyristor which applies a reverse voltage between the anode and cathode of the thyristor when turning off the thyristor and which comprises an inverse bias circuit; said inverse bias circuit comprising a first path across the gate and cathode of the thyristor and a second path acrosss the gate and anode of the thyristor; and said bias circuit applying a reverse bias voltage having opposite polarity to the ignition signal between the gate and the cathode of the thyristor.

22 Claims, 5 Drawing Figures 3,938,027

ELECTRICAL THYRISTOR CIRCUIT

BACKGROUND OF THE INVENTION

1. Field of the Invention

The present invention relates to an improved electrical circuit having a thyristor such as a thyristor inverter or a thyristor chopper where the circuit includes circuitry for turning off the thyristor.

2. Description of the Prior Art

In general, thyristors have been used for imparting ON-OFF control to electric circuits such as an inverter or a chopper. The electrical circuit having a thyristor usually includes a turn-off circuit for turning off the thyristor. The turn-off circuit applies a reverse voltage (that is a voltage to give a positive polarity to the cathode and a negative polarity to the anode) between the anode and cathode of the thyristor to turn off the thyristor. The complexity of prior art circuits for turning off a thyristor has led to a need for a simple and uncomplicated circuit which can perform this function. It is preferable to turn off the thyristor in as short a time as possible. This is especially important for circuits where the thyristor is repeatedly turned on and off for short repeated periods such as an inverter or a chopper.

SUMMARY OF THE INVENTION

Accordingly, it is an object of the present invention to provide an improved electrical circuit of simple design for applying a reverse bias voltage between the gate and cathode of a thyristor.

The object of the present invention has been attained by providing an electrical circuit comprising at least one thyristor having an anode, cathode and gate; an ignition circuit for applying an ignition signal between the gate and cathode of the thyristor when turning on the thyristor; a turn-off circuit for turning off the thyristor which applies a reverse voltage between the anode and cathode of the thyristor when turning off the thyristor and which comprises an inverse bias circuit; said inverse bias circuit comprising a first path across the gate and cathode of the thyristor and a second path across the gate and anode of the thyristor; and said bias circuit applying a reverse bias voltage having opposite polarity to the ignition signal between the gate and cathode of the thyristor.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1:
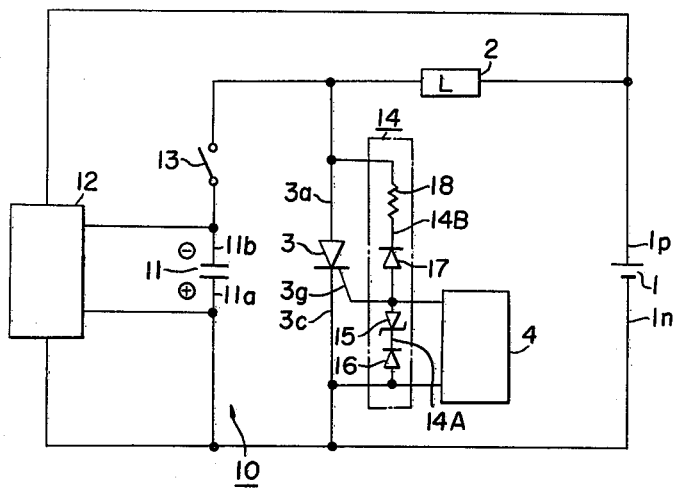
FIG. 1 is an electrical circuit diagram showing the basic structure of the electrical circuit of the present invention.

FIG. 1 shows the basic structure of the electrical circuit of the invention, which includes a power source 1 which can be a DC power source or an AC power source. In FIG. 1, the DC power source 1 has a first terminal 1p of positive potential and a second terminal 1n of negative potential. The electrical circuit comprises a load 2 and a thyristor 3 connected in series. The load 2 can be a DC load or an AC load. The thyristor 3 is a three terminal thyristor having anode 3a, cathode 3c and gate 3g. The anode 3a of the thyristor 3 is connected through a load 2 to the power source 1.

The cathode 3c is directly connected to the second terminal 1n of the power source 1. A conventional ignition circuit 4 is connected between the gate and cathode of the thyristor 3. The ignition circuit 4 applies an ignition signal Vi between the gate and cathode of the thyristor so as to give a positive polarity to the gate 3g when turning on the thyristor 3.

The circuit of FIG. 1 comprises a turn-off circuit 10 for turning off the thyristor 3. The turn-off circuit 10 comprises a commutation capacitor 11 and a charging circuit for charging the commutation capacitor 11 with a predetermined polarity. The capacitor 11 has terminals 11a, 11b and the terminal 11a is directly connected to the cathode 3c of the thyristor 3 and the terminal 11b is connected through a switching element 13 to the anode 3a of the thyristor 3. The charging circuit 12 charges the capacitor 11 to a predetermined polarity shown in FIG. 1 that is a positive polarity of the terminal 11a for turning off the thyristor 3. In the embodiment shown in FIG. 1, the charging circuit 12 is connected to DC power source 1 so as to be fed from the DC power source 1. However, it is possible to connect charging circuit 12 to another power source.

The charging circuit 12 connected to the DC power source 1 comprises a switch for charging the capacitor to the polarity of FIG. 1 by switching the polarity of the DC power source 1. Alternatively, an inductance may be utilized for charging the capacitor 11 to the polarity of FIG. 1. The turn-off circuit 10 comprises an inverse bias circuit 14 which comprises a first path 14A across the gate 3g and the cathode 3c of the thyristor 3 and a second path 14B across the gate 3g and the anode 3a of the thyristor 3. The first path 14A comprises a voltage control element 15 and a diode 16 which are connected in series to each other. The voltage control element 15 can be a zener diode or a selenium rectifier or a non-linear resistor.

In the embodiment of FIG. 1, the voltage control element 15 is a zener diode whose anode is connected to the gate 3g. The cathode is connected to the cathode of the diode 16. The anode of the diode 16 is connected to the cathode 3c. When the voltage applied between the gate and cathode of the thyristor 3 has a first polarity to give a positive polarity to gate 3g, the zener diode 15 is forward biased, but the diode 16 is reverse biased whereby voltage of the first polarity is blocked by the diode 16.

When the voltage has a second polarity to give a positive polarity to the cathode 3c, the diode 16 is forward biased and the zener diode 15 is reverse biased whereby voltage less than the zener voltage of the zener diode 15 is blocked. Of course, when the second polarity voltage is higher than the zener voltage, current corresponding to the excess voltage is passed to the first path 14A.

When a selenium rectifier is used as the element 15, the anode of the selenium rectifier is connected to the gate 3g of the thyristor 3 and the cathode is connected to the cathode of the diode 16. The selenium rectifier operates to control voltage less than a predetermined value in the reverse direction. The second path 14B comprises a diode 17 and a resistor 12 which are connected in series to each other. The anode of the diode 17 is connected to the gate 3g of the thyristor 3 and the cathode is connected through the resistor 18 and the anode 3a of the thyristor 3.

Figure 2:
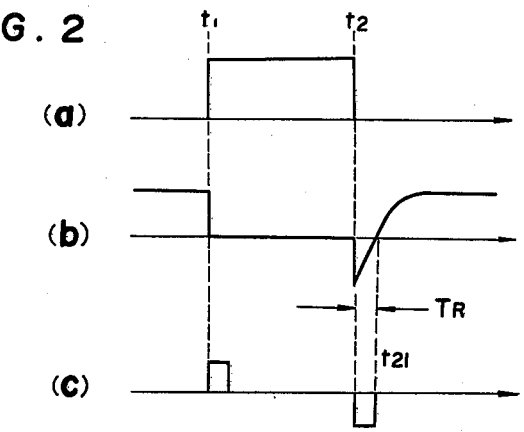
FIG. 2 shows waveform characteristics illustrating the operation of the circuit shown in FIG. 1.

Referring to FIG. 2, the operation of the embodiment is illustrated. FIG. 2a shows a waveform of current passing from the anode 3a to the cathode 3c of the thyristor. FIG. 2b shows a waveform of voltage applied between the anode and cathode of the thyristor 3. FIG. 2c shows a waveform of voltage applied between the gate and cathode of the thyristor 3.

At the time $t_1$, the ignition signal Vi is applied from the ignition circuit 4 whereby the thyristor 3 is turned on. The ignition signal Vi is applied to give a positive polarity to the gate 3g between the gate and cathode of the thyristor 3 whereby the ignition current is effectively passed to the gate 3g without diversion to the first path 14A. When the thyristor 3 is turned on, the current as shown in FIG. 2a is passed from the anode 3a to the cathode 3c. The current is load current passing through the load 2.

At a time $t_2$ when the commutation capacitor 11 is charged to the polarity shown in FIG. 2, the switching element 13 is closed whereby the thyristor 3 begins its turn-off operation. That is, the voltage of the capacitor 11 is applied through the switching element 13 between the anode and cathode of the thyristor 3 as a reverse voltage. The reverse bias voltage Vr is applied through the first and second paths 14A, 14B between the gate and cathode of the thyristor 3. The reverse voltage is applied to the diode 16, the zener diode 15, the diode 17 and the resistor 18. The reverse voltage gives a positive polarity to the cathode 3c and a negative polarity to the anode 3a.

The diodes 16, 17 are forward biased by the reverse voltage. The reverse bias voltage Vr reverse biases the zener diode 15. The forward voltage of diode 16 is negligibly small.

Figure 3:
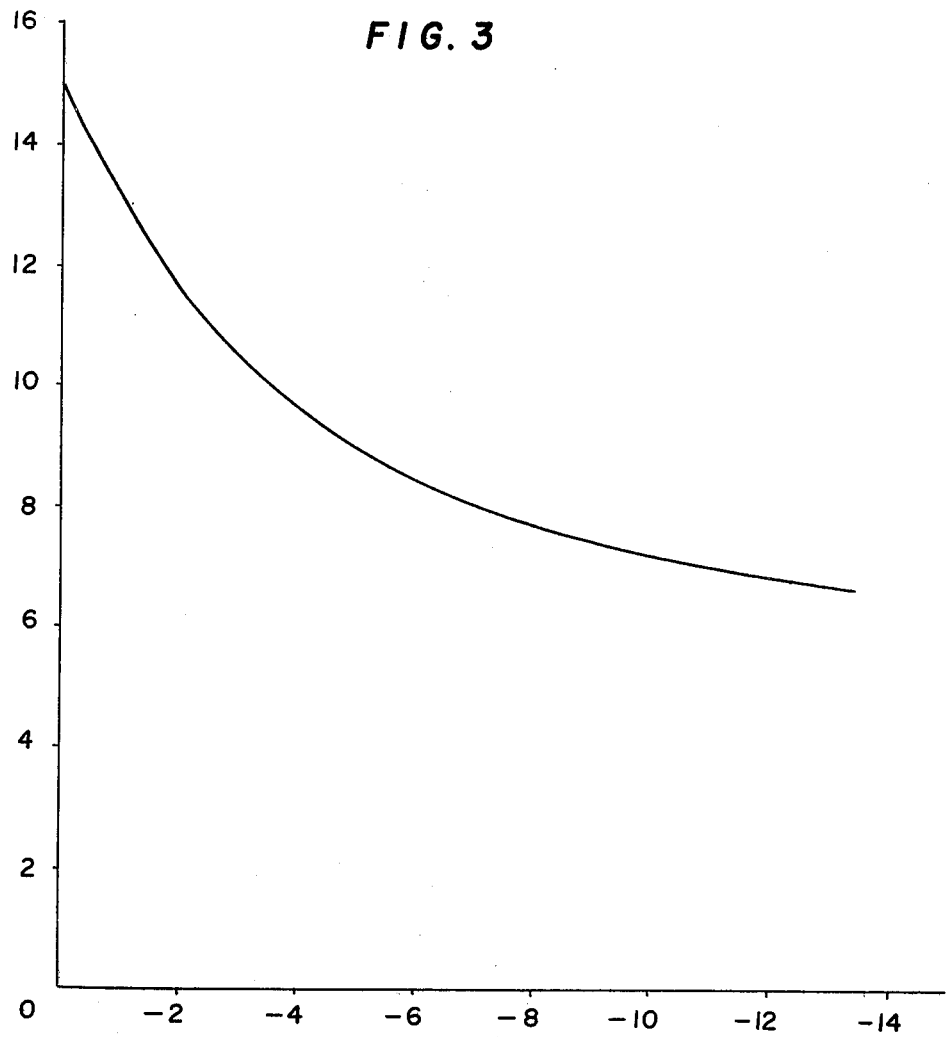
FIG. 3 shows a characteristic curve showing the relation of reverse bias voltage applied between the gate and cathode of the thyristor to the turnoff time of the thyristor.

The reverse bias voltage Vr applied between the anode and cathode of the thyristor 3 is effective to shorten the turn-off time by promoting the turnoff operation of the thyristor 3. FIG. 3 shows a characteristic curve between the reverse bias voltage Vr and the turn-off time $t_q$ of the thyristor 3. The thyristor 3 has a turn-off time of 15 $\mu$s at Vr = 0 (the reverse bias voltage Vr is not applied). The turn-off time is shortened to about 7.3 $\mu$s by applying the reverse bias voltage Vr having a peak value of 10 V. The turn-off of the thyristor can be attained by applying the reverse voltage between the anode and cathode of the thyristor 3 for a time equal to or large than the turn-off time $t_q$. That is, it is necessary to apply a reverse voltage continuously for a period longer than the turn-off time $t_q$ in order to turn-off the thyristor 3.

In FIG. 2b, the reverse voltage is continuously applied from the time $t_2$ to the time $t_{21}$. The time the reverse voltage is applied is indicated as $T_R$.

In the circuit of FIG. 1, the zener diode 15 prevents the application of excess reverse bias voltage between the gate and cathode of the thyristor 3 so as to protect the thyristor 3. The diode 17 prevents the application of positive voltage from the anode 3a of the thyristor through the resistor 18 to the gate 3g of the thyristor 3 so as to prevent accidental ignition of the thyristor 3. The resistor 18 controls the current passing through the paths 14A, 14B.

In the inverse bias circuit shown in FIG. 1, the position of the zener diode 15 can be interchanged with the diode 16. In this case, the cathode of the zener diode 15 is connected to the cathode 3c of the thyristor 3 and the cathode of the diode 16 is connected to the gate 3g. It is also possible to interchange the position of the diode 17 and the resistor 18.

Figure 4:
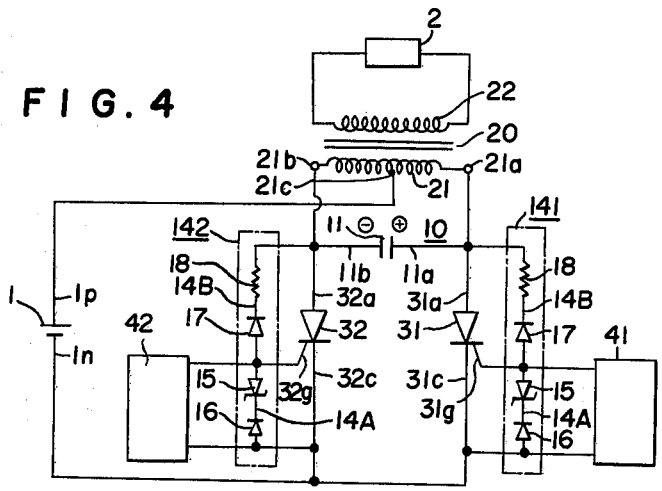
FIG. 4 is an electrical circuit diagram of a thyristor inverter according to the invention.

FIG. 4 shows an inverter according to the invention. The inverter is a parallel type inverter which has a transformer 20 comprising an input coil 21 and an output coil 22. The load 2 is connected to the output coil 22. The input coil 21 comprises first and second terminals 21a, 21b and a middle terminal 21c placed between them. The middle terminal 21c is connected to the first terminal 1p of the DC power source 1. The inverter has a pair of thyristors 31, 32. The anode 31a of the thyristor 31 is connected to the first terminal 21a of the input coil 21 and the cathode 31c is connected to the second terminal 1n of the DC power source 1. The anode 32a of the thyristor 32 is connected to the second terminal 21b of the input coil and the cathode 32c is connected to the second terminal 1n of the DC power source 1. The commutation capacitor 11 is connected between the anodes 31a, 32a of the thyristors 31, 32 and the terminal 11a of the capacitor 11 is connected to the anode 31a and the terminal 11b is connected to the anode 32a.

The ignition circuit 41 is connected between the gate and cathode of the thyristor 31 and the ignition circuit 42 is connected between the gate and cathode of the thyristor 32. When the thyristors 31, 32 should be turned on, the ignition circuits 41, 42 apply ignition signals to give a positive polarity to the gates 31g, 32g. The inverse bias circuit 141 is connected to the thyristor 31 and the inverse bias circuit 142 is connected to the thyristor 32. The structures of the inverse bias circuits 141, 142 are the same and are also the same as the inverse bias circuit 14 shown in FIG. 1. The path 14A of inverse bias circuit 141 is across the gate 31g and cathode 31c of the thyristor 31. The path 14B of the circuit 141 is across the gate 31g and anode 31a of the thyristor 31. The path 14A of the inverse circuit 142 is across the gate 32g and cathode 32c of the thyristor 32. The path 14B of the circuit 142 is across the gate 32g and anode 32a of the thyristor 32. When the thyristor 31 is turned on by the ignition signal transmitted from the ignition circuit 41, current is passed from the terminal 1p of the DC power source 1 through the middle terminal 21c and the first terminal 21a of the input coil 21 and the thyristor 31 of the terminal 1n of the DC power source 1. Simultaneously, current is passed from the terminal 1p of the DC power source 1 through middle terminal 21c, second terminal 21b of the input coil 21, capacitor 11, and thyristor 31 to terminal 1n of the DC power source 1 whereby capacitor 11 is charged with a polarity opposite to that shown in FIG. 4.

The turn-off operation of the thyristor 32 begins by applying the voltage of the capacitor 11 charged to the polarity shown in FIG. 4 as the reverse voltage between the anode and cathode of the thyristor 32. The turn-off operation of the thyristor 31 begins by applying the voltage of the capacitor 11 charged to the polarity opposite to that shown in FIG. 4 as the reverse voltage between the anode and cathode of the thyristor 31.

The inverse bias circuits 141, 142 apply the reverse voltage between the gate and cathode whereby the turn-off operation of the corresponding thyristor 31, 32 is promoted.

Figure 5:
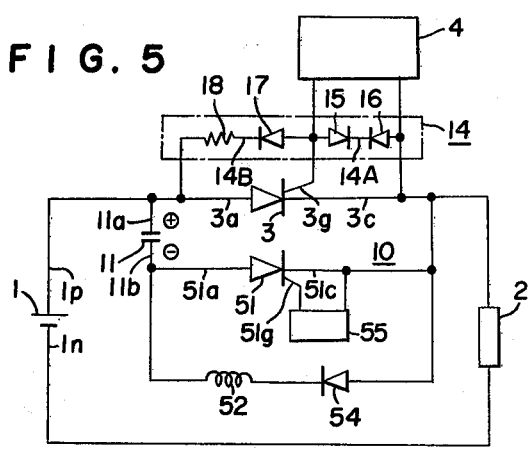
FIG. 5 is an electrical circuit diagram of a thyristor chopper according to the invention.

FIG. 5 shows the thyristor chopper according to the invention. In the chopper, the anode 3a of the thyristor 3 is connected to the first terminal 1p of the DC power source 1 and the cathode 3c is connected through the load 2 to the second terminal 1n of the DC power source 1. The thyristor 3 is connected to the ignition circuit 4 and the inverse bias circuit 14 in a manner similar to that of FIG. 1. The chopper comprises an auxiliary thyristor 51, a commutation capacitor 11, a commutation reactor 52 and a diode 54. The terminal 11a of the commutation capacitor 11 is connected to the anode 3a of the thyristor 3 and the other terminal 11b is connected to the anode 51a of the auxiliary thyristor 51. The cathode 51c of the auxiliary thyristor 51 is connected to the cathode 3c of the thyristor 3.

An ignition circuit 55 for turning on the thyristor 51 is connected between the gate 51g and cathode 51c of the auxiliary thyristor 51. The commutation reactor 52 and the diode 54 are connected in series between the anode 51a and cathode 51c of the auxiliary thyristor 51. The anode of the diode 54 is connected to the cathode 51c of the thyristor 51 and the anode is connected through the reactor 52 to the anode 51a of the thyristor 51.

When the thyristor 51 is turned on by the ignition circuit 55, current is passed from the terminal 1p of the DC power source 1 through the capacitor 11, the thyristor 51 and the load 2 to the terminal 1n whereby the capacitor is charged to the polarity shown in FIG. 5. When the thyristor 3 is turned on by the ignition circuit 4, current is passed from the DC power source 1 through the thyristor 3 to the load 2. Simultaneously, the voltage of the capacitor 11 charged to the polarity shown in FIG. 5 is applied as a reverse voltage between the anode and cathode of the thyristor 51 by turning on the thyristor 3 whereby the thyristor 51 is turned off. After turning off the thyristor 51, the capacitor 11 discharges the charge having the polarity shown in FIG. 5 through the thyristor 3, the diode 54 and the reactor 52. The discharge is stopped in the state where the capacitor 11 has been charged to the polarity opposite to that shown in FIG. 5 by the resonance of the capacitor 11 and the reactor 52. When the thyristor 51 is again turned on in this state, the voltage of the capacitor 11 is applied as a reverse voltage through the thyristor 51 between the anode and cathode of the thyristor 3 whereby the turn-off operation of the thyristor 3 begins. The reverse bias voltage is applied between the gate and cathode of the thyristor 3 by the inverse bias circuit 14 whereby the turn-off operation of the thyristor 3 is promoted.

Obviously, many modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. An electrical circuit comprising at least one thyristor having an anode, cathode and gate;
an ignition circuit for applying an ignition signal between the gate and cathode of the thyristor when turning on the thyristor;
a turn-off circuit for turning off the thyristor which applies a reverse voltage between the anode and cathode of the thyristor when turning off the thyristor and which comprises an inverse bias circuit;
said turn off circuit comprising a commutation capacitor connected by switch means across the anode and cathode of the thyristor, means for reverse charging the commutation capacitor while the thyristor conducts so that upon actuation of the switch means the commutation capacitor applies voltage to the anode of the thyristor which is negative with respect to the voltage applied by the commutation capacitor to the cathode of the thyristor;
said inverse bias circuit comprising a first path across the gate and cathode of the thyristor and a second path across the gate and anode of the thyristor; and
said inverse bias circuit applying a reverse bias voltage having opposite polarity to the ignition signal between the gate and cathode of the thyristor.

2. The electrical circuit according to claim 1 wherein the second path comprises a diode which is connected between the gate and anode of the thyristor to give a forward direction characteristic to the voltage which applies a positive polarity to the gate.

3. The electrical circuit according to claim 2 wherein the second path comprises a resistor connected in series to the diode.

4. The electrical circuit according to claim 1, wherein said first path comprises a voltage control element so as to apply an inverse bias voltage which is sufficient to shorten the turn-off time of the thyristor between the gate and cathode of the thyristor.

5. The electrical circuit according to claim 4 wherein said voltage control element is a zener diode which is connected to give a reverse direction characteristic to the reverse bias voltage.

6. The electrical circuit according to claim 5 wherein the first path comprises a diode in series with the zener diode and the diode is connected to give a forward direction characteristic to the reverse bias voltage.

7. An electrical circuit comprising:
a DC power source having first and second terminals;
a transformer having an input coil and an output coil;
said input coil having a middle terminal disposed between its first and second terminals and being connected to the first terminal of said DC power source;
a load connected to the output coil of said transformer;
a first thyristor connected between the first terminal of said input coil and the second terminal of said DC power source;
a second thyristor connected between the second terminal of said input coil and the second terminal of said DC power source;
each of said thyristors having an anode, cathode, and gate;
a commutation capacitor between the first and second terminals of said input coil;
said commutation capacitor being reverse charged while each of the thyristors conducts to apply a reverse voltage between the anode and cathode of each of said thyristors to give a positive polarity to the cathode when turning off each of said thyristors;

a first inverse bias circuit connected to the first thyristor and a second inverse bias circuit connected to the second thyristor whereby the reverse bias voltage is applied between the gate and cathode of each of said thyristors to give a positive polarity to the cathode when turning off said thyristors.

8. The electrical circuit according to claim 7 further comprising a first path across the gate and cathode of the first thyristor and a second path across the gate and anode of the first thyristor in the first inverse bias circuit; and a first path across the gate and cathode of the second thyristor and a second path across the gate and anode of the second thyristor in the second inverse bias circuit.

9. The electrical circuit according to claim 8 further comprising a voltage control element for applying inverse voltage sufficient to shorten the turn-off time of the thyristor between the gate and cathode of each thyristor in each of the first paths of the first and second bias circuits.

10. The electrical circuit according to claim 9 wherein the voltage control element is a zener diode which is connected so as to impart an inverse direction characteristic to the inverse bias voltage.

11. The electrical circuit according to claim 18 wherein the first paths of the first and second inverse bias circuits each include a diode connected in series to the zener diode with each diode being connected so as to impart a forward direction characteristic to the inverse bias voltage.

12. The electrical circuit according to claim 8 wherein the second paths of the first and second inverse bias circuits each include a diode which is respectively connected so as to impart an inverse direction characteristic to the voltage applied between the gate and anode of the thyristor under positive polarity for the anode.

13. The electrical circuit according to claim 12 wherein the second path of the first and second inverse bias circuits comprises a resistor connected in series to the diode.

14. An electrical circuit comprising:
a first thyristor connected in series to a load and a DC power source;
said first thyristor having an anode, cathode, and gate;
an ignition circuit for applying an ignition signal between the gate and cathode of the first thyristor when turning on the first thyristor;
a turn-off circuit for turning off the first thyristor;
said turn-off circuit comprising a commutation capacitor and a second thyristor;
said commutation capacitor being reverse charged while the first thyristor conducts to apply a reverse voltage between the anode and cathode of the first thyristor to give a positive polarity to the cathode during the turn-on of the second thyristor;
said turn-off circuit comprising an inverse bias circuit which has a first path across the gate and cathode of the first thyristor and a second path across the gate and anode of the first thyristor;
said inverse bias circuit applying a reverse bias voltage having a polarity opposite to the ignition signal between the gate and cathode of the first thyristor.

15. The electrical circuit according to claim 14 wherein said commutation capacitor is charged to a predetermined polarity during turning on of the first thyristor and the reverse voltage is applied to the first thyristor by the turn-on of the second thyristor when the charged voltage has a predetermined polarity.

16. The electrical circuit according to claim 15 wherein said commutation capacitor is charged from the DC power source to yield a polarity opposite to the predetermined polarity by turning on the second thyristor before the turn-on of the first thyristor, and the charged polarity is inverted by the turn-on of the first thyristor to charge said capacitor in the predetermined polarity.

17. The electrical circuit according to claim 16 which further comprises a circuit comprising a commutation reactor and a diode in series so as to invert the polarity of the commutation capacitor from the opposite polarity to the predetermined polarity.

18. The electrical circuit according to claim 14 wherein the first path of the inverse bias circuit comprises a voltage control element for applying inverse bias voltage sufficient to shorten the turn-off time of the thyristor between the gate and cathode of the first thyristor.

19. The electrical circuit according to claim 18 wherein the voltage control element is a zener diode which is connected so as to impart an inverse direction characteristic to the inverse bias voltage.

20. The electrical circuit according to claim 19 wherein the first path of the inverse bias circuit comprises a diode connected in series to the zener diode, the diode being connected to impart a forward direction characteristic to the inverse bias voltage.

21. The electrical circuit according to claim 20 wherein the second path of the inverse bias circuit comprises a diode which is connected so as to impart an inverse direction characteristic to the voltage applied between the gate and anode of the first thyristor under positive polarity for the anode.

22. The electrical circuit according to claim 21 wherein the second path of the inverse bias circuit comprises a resistor connected in series to the diode.

* * * * *